L. C. CHURCH & J. C. PERKINS.
FRUIT-DRIERS.
No. 193,924. Patented Aug. 7, 1877.
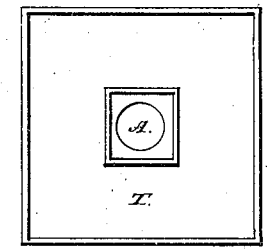
Fig. 4.
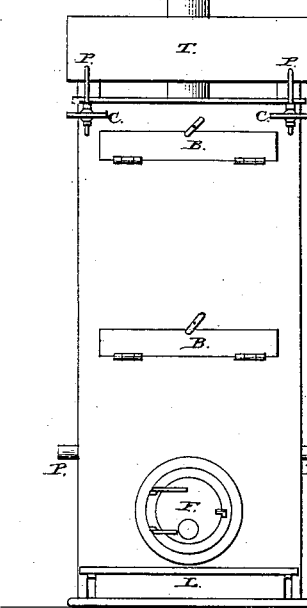
Fig. 1.
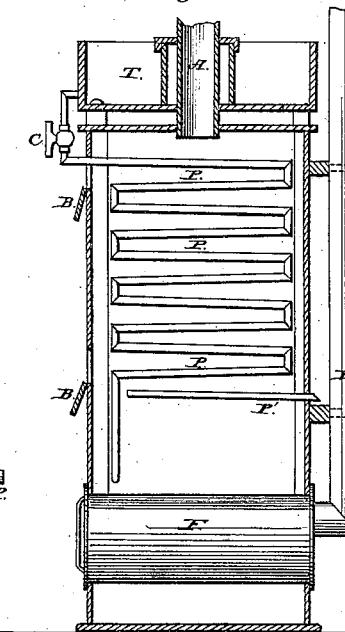
Fig. 2.
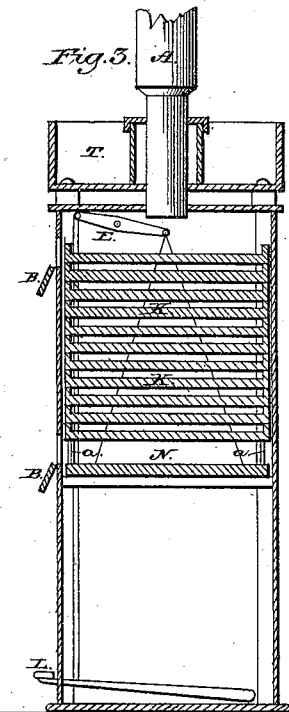
Fig. 3.
Fig. 5.
Attest:
Wm Green
R. F. Judson
Inventors:
Leonard C. Church
John C. Perkins

UNITED STATES PATENT OFFICE.

LEONARD C. CHURCH AND JOHN C. PERKINS, OF KALAMAZOO, MICHIGAN.

IMPROVEMENT IN FRUIT-DRIERS.

Specification forming part of Letters Patent No. 193,924, dated August 7, 1877; application filed February 19, 1877.

*To all whom it may concern:*

Be it known that we, LEONARD C. CHURCH and JOHN C. PERKINS, of Kalamazoo, in the county of Kalamazoo, State of Michigan, have invented certain Improvements in Devices for Drying Fruits and Vegetables, of which the following is a specification:

Our invention relates to a combination of a series of pipes used for condensing the vapor or steam escaping from drying fruits or vegetables, with a tank for supplying the pipes with cold water, with upper and lower ventilators for creating a draft, and thereby driving the moisture from the fruit or vegetables, together with a pedal and levers for raising the fruit or vegetables within the drier.

It may be constructed of any desirable size.

Figure 1 is a view of the drier complete, in which A shows the ventilator; T, the tank; B B, the openings through which the fruit is to be placed in and taken from the drier; F, the furnace, and L the pedal.

Fig. 2 is a sectional drawing, showing the position of the tank T, of the pipes P P P P, of the ventilator A, and the trough P', for carrying off the condensed vapor.

Fig. 3 is a sectional drawing, showing the fruit-racks K K, the platform N, and its connection with the lever E, by means of wires, for lifting the racks; also showing the connection of the lever E with the pedal L, by means of wire. *a a* show springs for holding racks while the platform descends to receive other racks.

Fig. 4 shows plan of tank T.

Fig. 5 is a detail, on an enlarged scale, showing the relation of the spring-catch to the platform and the trays.

Having mentioned the parts and construction of our invention, we now describe the mode of operating the same. First, fill the tank T, Fig. 3, with cold water; then fill the racks K K with fruit or vegetables, sliced or otherwise, as may be preferred. After making a fire in the furnace F, Fig. 2, place a rack with the fruit thereon through the opening B onto the platform N, Fig. 3. Press down the pedal L, thereby raising the platform N with the rack thereon. The rack is held in its place by the springs *a a*, and the platform N is lowered and another rack placed thereon, and this is repeated until the drier is filled. Pass a small stream of cold water from the tank T through the pipes P P P P by means of the stop-cock C, Fig. 2, which has the effect of condensing the vapor or steam escaping from the drying fruit or vegetables on the surface of the pipes, from whence it drips into the trough P', and thence runs out of the drier.

When a rack containing fruit appears at the upper opening B, Fig. 3, it can be taken out, if dry, and refilled, and placed through the lower opening B on the platform N, and thus the process of drying is continued as long as may be desired.

What we claim as our invention is—

The combination of the tank T, the condensing-pipes P P P P, the ventilator A, the racks K K, the pedal L, and the furnace F, substantially as and for the purpose hereinbefore set forth.

LEONARD C. CHURCH.
JOHN C. PERKINS.

Witnesses:
W. GREEN,
R. F. JUDSON.